Feb. 7, 1961 F. D. WERNER 2,970,475
GAS TEMPERATURE PROBE
Filed Oct. 8, 1956 4 Sheets-Sheet 1
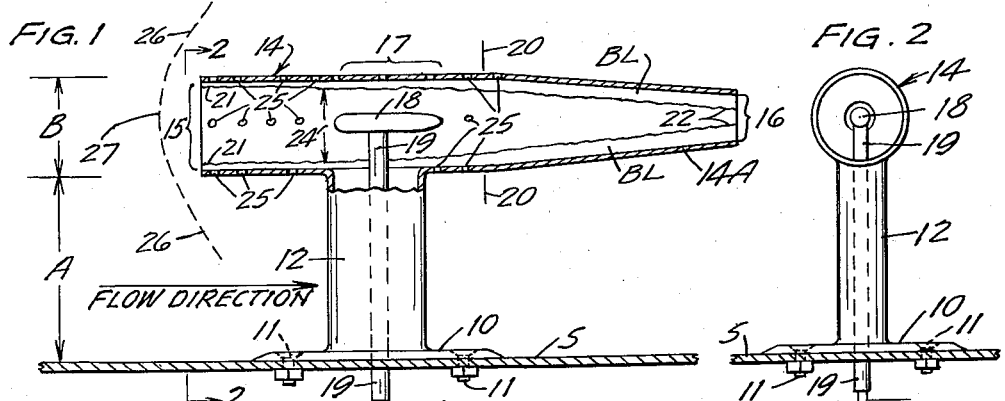
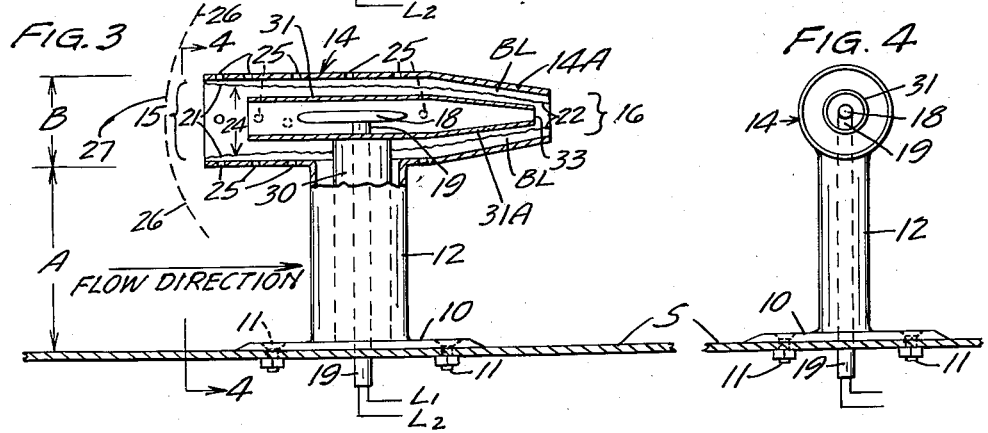
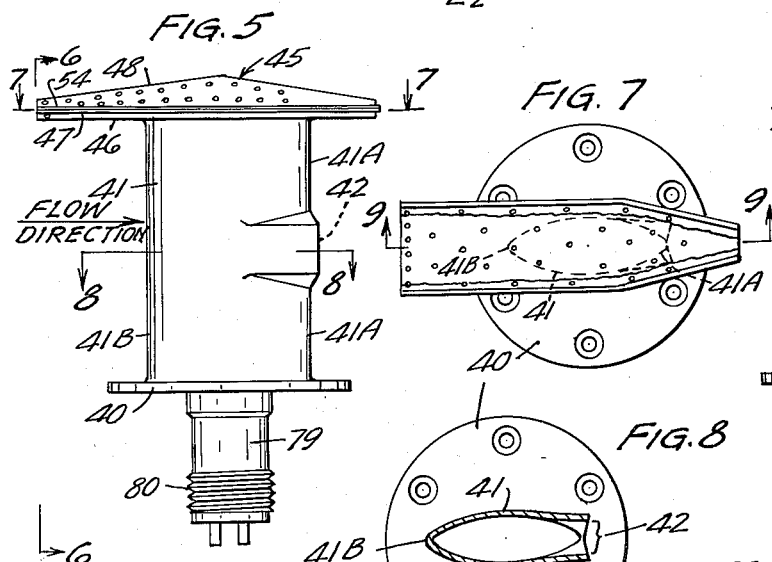
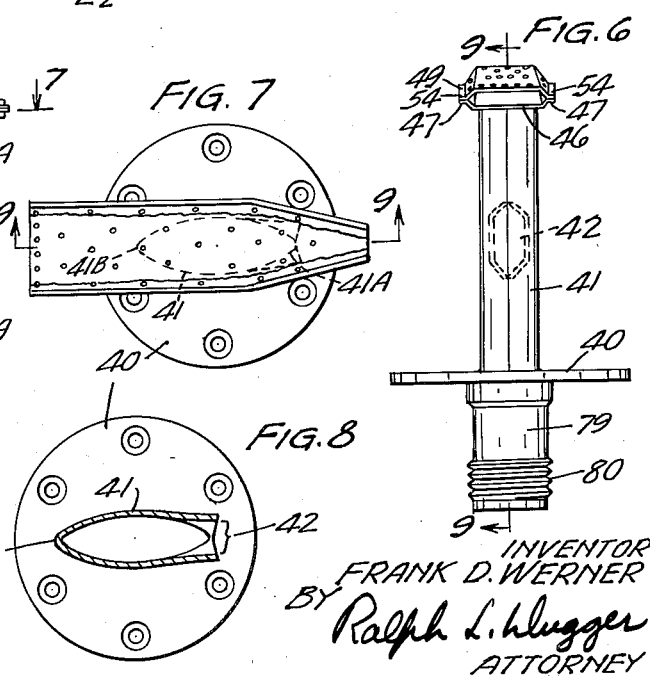
INVENTOR
FRANK D. WERNER
BY Ralph L. Wugger
ATTORNEY

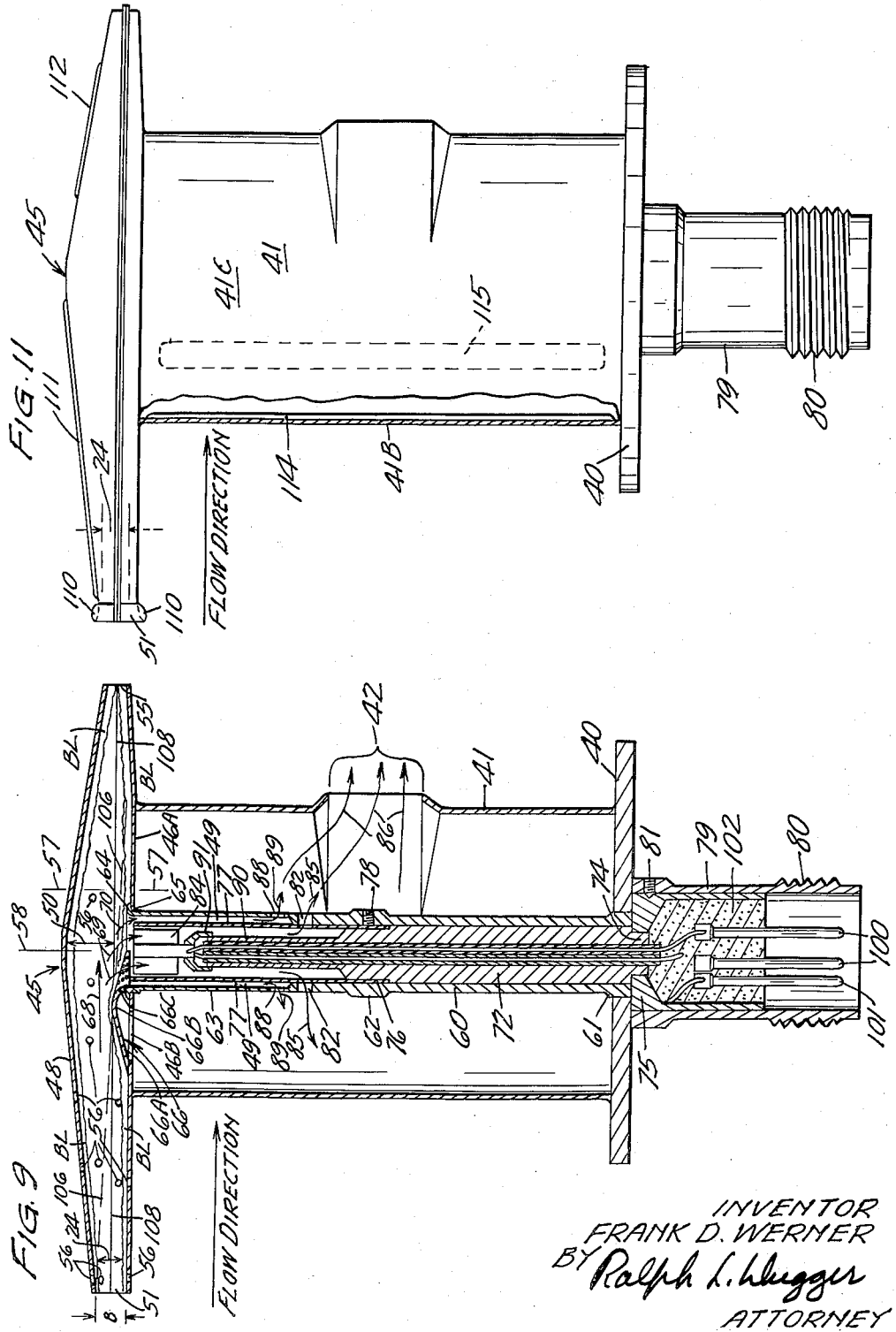

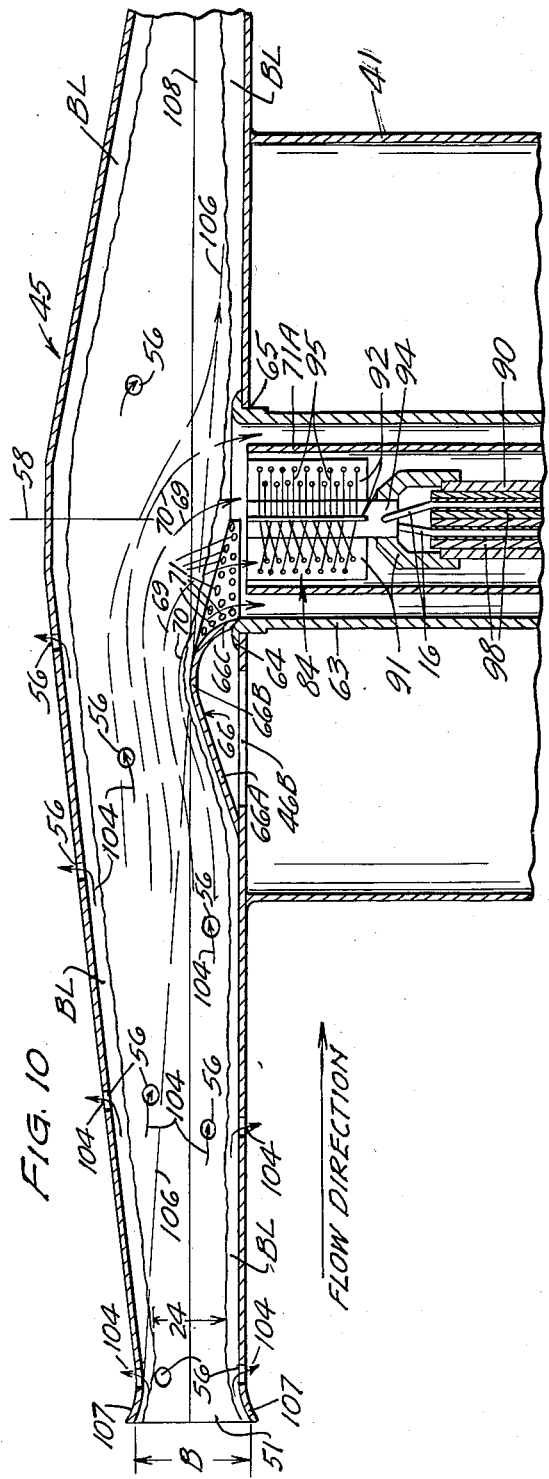
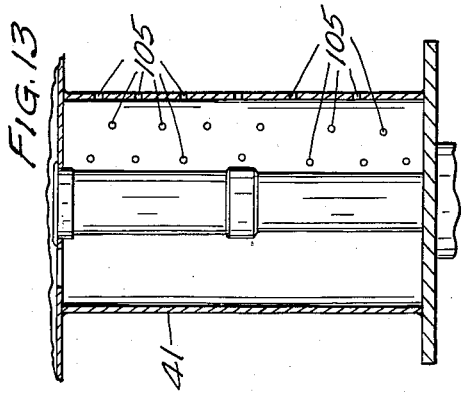
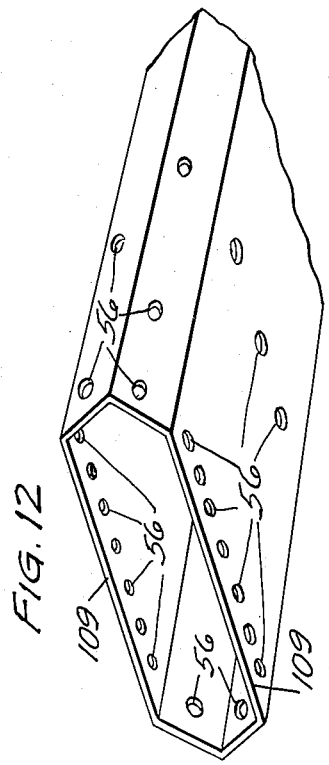

INVENTOR
FRANK D. WERNER
BY Ralph L. Dugger
ATTORNEY

United States Patent Office 2,970,475
Patented Feb. 7, 1961

2,970,475

GAS TEMPERATURE PROBE

Frank D. Werner, Rosemount, Minn., assignor to Rosemount Engineering Company, Rosemount, Minn., a corporation of Minnesota Filed Oct. 8, 1956, Ser. No. 614,583

15 Claims. (Cl. 73—339)

This invention relates to improvements in gas temperature probes, and particularly to those which are used for ascertaining such temperature measurement when the relative velocity of the gas may vary from zero velocity to supersonic velocity and/or under conditions where the gas may contain moisture or solid matter particles or both. The measurement of gas temperature presents relatively few problems where the velocity encountered is low and where moisture and/or solids are absent, but where the relative velocity between the gas and the temperature measuring device is high, i.e., from about Mach 0.25 and above, such measurements by known devices provide only unreliable information. Thus, as the velocities are increased through the subsonic, trans-sonic and supersonic ranges, temperature indications provided by prior art devices become increasingly unreliable, the degree of unreliability being increased and even at lower velocities, where the gaseous media contains discrete moisture or contains solid particles.

For convenience in the matter of nomenclature, the term "velocity" as used herein will be understood to be the relative velocity between the gaseous fluid and the temperature measuring device (temperature "sensor"), whether such velocity is the velocity of the fluid where the gaseous fluid is propelled past a fixed probe, as in laboratory work, or whether the probe is moved through and relative to the gaseous fluid, as when mounted on aircraft and missiles. Also, the temperature measuring device will, for convenience, be shortened to "temperature sensor" or "sensor." The terms "Mach" and "total temperature" and others used herein have the same meanings herein as in the aeronautical sciences. Likewise, it will be understood that the usefulness of the present inventions and discoveries is not limited to the aeronautical sciences or limited to use solely in air temperature measurements, although it is in connection with such that the inventions hereof presently have principal usefulness. The terms "gaseous fluid" as used herein include mixtures of gaseous fluids, such as air, the total temperature conditions of which are to be read. The term "invention" will be understood to be inclusive of discovery.

According to this invention, it has been found that the unreliability of total temperature measurements by instruments now available is due primarily to the inability of such present instruments to read accurately the temperature of the gaseous fluid when it is brought to rest against the instrument. When the Mach number of the air velocity is greater than about Mach 0.3, the air which is brought to rest suddenly at the surface of the temperature sensor is caused to heat appreciably. This temperature is sometimes said to be caused by friction effects and sometimes said to be caused by compression of the air. While these factors are involved it is believed that when the high velocity of the individual gas molecules is suddenly arrested at the surface of the temperature sensor, such velocity is converted to random high speed motion, which is a concomitant of high temperature. Where this occurs, the temperature sensor is heated and hence becomes a radiator, the degree of radiation increasing as a function of the absolute temperature. If the sensor is enclosed in a housing, as in elementary total temperature probes of the kind heretofore available, the housing acts as a heat absorber and the housing, therefore, effects the accuracy of the instrument, the deviations from true accuracy being additionally effected by boundary layer effects between the housing and sensor.

It is the object of the present invention to overcome the aforesaid radiation, housing and boundary layer effects and to provide an improved total temperature probe.

One principal field wherein the measurement of the air total temperature is presently accomplished to only an unreliable degree by elementary total temperature probes is in connection with jet aircraft and missiles where the working velocities range from zero, as when the aircraft or missile is at rest, to supersonic velocity as when the aircraft or missile reaches its working speeds at altitude.

Superimposed upon the inaccuracies arising out of the radiation, housing and boundary layer effects inherent in instruments used for such high velocity range service are also the problems engendered by the fact that under many conditions the aircraft or missile is required to execute take-off and/or landing through low level atmospheric conditions wherein there may be present insects, dust and very frequently condensed moisture. In many instances, icing conditions are also encountered.

While the problems, of which the present inventions offer solutions, are illustrated by conditions encountered in the field of jet aircraft and missiles, the uses of inventions hereof are by no means limited to such fields, since in laboratory and analytical airflow analysis the conditions of moisture and solids may be eliminated, and in aircraft, conventional instruments may be used for low level, low velocity flight and the inventions hereof, in primary form, may, if desired, be used for high level and/or high velocity conditions. Therefore, it is an additional object of the present invention to provide several forms of improved gas temperature probes which are, according to the particular form, suited for conditions wherein moisture and/or solids are absent and other forms suitable where moisture and/or solids may be present and/or where icing conditions may be encountered.

It is a specific object of the invention to provide a total temperature probe wherein deviation from accuracy due to boundary layer effects is reduced to an acceptable minimum.

It is another object of the invention to provide an improved total temperature probe wherein inaccuracies due to radiation is reduced to an acceptable minimum.

It is a further object of the invention to provide a total temperature probe wherein the inaccuracies due to impingement of moisture and/or ice upon the instrument are reduced to an acceptable minimum.

It is a further object of the invention to provide a total temperature probe wherein the temperature sensor is protected from impingement thereon of solids and/or liquids which may be present in the gaseous media.

It is an additional object of the invention to provide a total temperature probe wherein inaccuracies due to non-axial flow against the instrument are minimized.

It is another object of the invention to provide a total temperature probe wherein whose portions of the instrument which are susceptible to icing during use are provided with heaters for de-icing without adversely affecting the accuracy of the total temperature indication provided by the probe.

It is a specific object of the invention to provide a total temperature probe wherein inaccuracies due to boundary layer effect, radiation, impingement of moisture and/or solids, icing conditions and non-axial flow are reduced or eliminated without adversely affecting the accuracy of indication of total temperature by the probe instrument.

The invention is illustrated with reference to the drawings wherein:

Figures 1 and 2 show a primary form of the invention wherein the adverse effects of boundary layer are minimized. Figure 1 is a side elevational view, partly broken away and sectioned and Figure 2 is an elevational view taken in the direction of arrows 2—2 of Figure 1;

Figures 3 and 4 show another primary form of the invention wherein the adverse effects of both boundary layer and radiation are minimized. Figure 3 is a side elevational view partly broken away and sectioned and Figure 4 is an end elevational view taken in the direction of arrows 4—4 of Figure 3;

Figure 14:
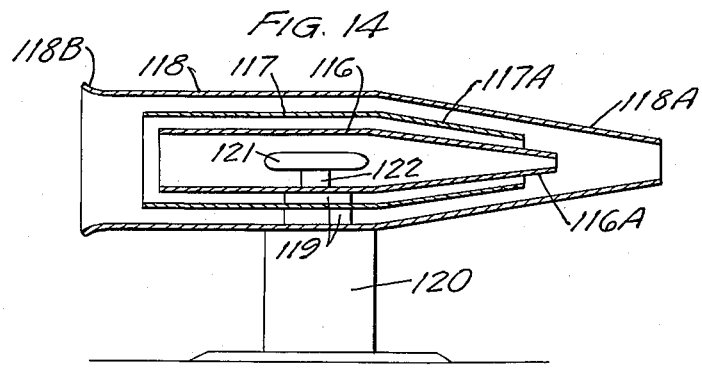
Figure 15:
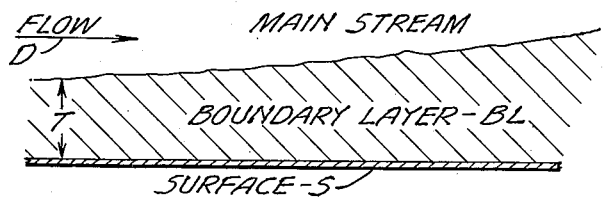
Figure 16:
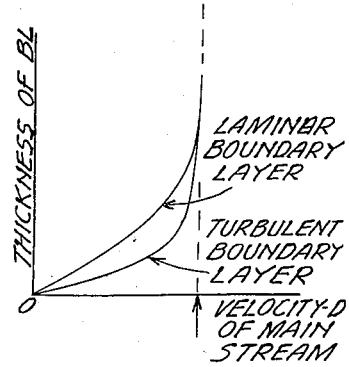

Figures 5, 6, 7, 8, and 9 are related views of a form of the invention wherein the adverse effects of boundary layer, radiation and due to impingement of moisture and/or solids upon the temperature sensor are reduced to an acceptable minimum. Figure 5 is a side elevational view; Figure 6 an end elevational view taken in the direction of arrows 6—6 of Figure 5; Figure 7 is a top sectional view taken in the direction of arrows 7—7 of Figure 5; Figure 8 is a sectional view at the level and in the direction of arrows 8—8; Figure 9 is an enlarged vertical sectional view taken in the direction of arrows 9—9 of Figures 6 and 7;

Figure 10 is a much enlarged and fragmentary view of a portion of Figure 9, and is slightly modified as compared to Figure 9. Figure 10 is an enlarged fragmentary vertical sectional view;

Figures 11, 12, and 13 are views showing several modifications which may optionally be incorporated in any of the forms of the invention, each view being such as best to illustrate the particular modification. Figure 11 is a side elevational view partly broken away and sectioned, illustrating the mode of applying de-icing heaters to the instrument; Figure 12 is a three-quarter front view in perspective, illustrating a preferred form of boundary layer control at the air entrance end of the instrument for avoiding the adverse effects due to non-axial flow; Figure 13 is a fragmentary vertical sectional view through the instrument mounting illustrating a varient form of construction for exhausting some of the air passing through the instrument;

Figure 14 is a side elevational view, partly broken away and sectioned, illustrating a further modified form of the invention wherein discrete apertures in the outer shell are eliminated by using a conduit shell composed of a material permeable to flow of the gaseous fluid therethrough and provision is made for multiple shielding to reduce radiation inaccuracies;

Figures 15–19 are explanatory sketches illustrating the boundary layer effect and the manner in which the deleterious effects thereof can be obviated by utilizing the principles of the present invention. Figures 15, 17, 18 and 19 are sectional views and Figure 16 is a graph.

Throughout the drawings the same numerals refer to corresponding parts. In referring to the drawings herein, the terms top, side, etc., are merely with reference to the position on the sheet of drawings since it will be understood that the devices herein may, in actual use, be mounted inverted or on the side of an aircraft or missile or in any convenient position.

To the accomplishment of the foregoing and related ends, this invention then comprises features hereinafter fully described and particularly pointed out in the claims, the following disclosure setting forth in detail illustrative embodiments of the invention, these being indicative, however, of but a few of the various ways in which the principles of the invention may be employed.

Referring to the drawings in Figures 1 and 2, to the mounting surface S there is fitted a base plate 10, which is attached by bolts or any other suitable fastening 11.

From the base plate extends a hollow post 12 which is streamlined for movement of the fluid in the direction from left to right in Figure 1. The part 12 has a sufficient dimension A so as properly to situate the instrument main body 14 at a position removed from surface S so as to provide a true sample fluid flow in the region indicated by the dimension B.

The instrument main body 14 is a hollow, elongated conduit which has a cross-section which may be circular or non-circular. In Figure 1, here illustrated, the body tube 14 is shown circular, but other non-circular cross-sections may be used as shown in Figures 5–12. The hollow main body or conduit 14 has an inlet 15 for entrance of the sample flow of gaseous fluid and an exit 16 of smaller dimensions than the inlet 15 for delivering part of the sample fluid which enters the inlet. In all forms of the invention some fraction of the sample flow of gaseous fluid is permitted to flow out through the wall of the conduit 14 as will be explained.

At a position indicated by bracket 17, which position may be defined as between the inlet 15 and exit 16 of the main body and generally centrally within it, there is located a temperature sensor 18 which can be of any one of a variety of temperature responsive elements such as a metal wire resistance thermometer, a thermocouple, thermistor, a hollow body viewed by a radiation pyrometer or any other form of temperature indicator. The temperature sensor 18 is mounted in any convenient manner as by a tubular post 19 extending through the hollow post 12. Suitable connection such as electrical leads as may be required for the particular form of sensor used extend from the temperature sensor 18 to a remotely located temperature indicator or recorder, not illustrated, and such connections extend through the hollow post 19. Such connection is here illustrated by the electrical leads L1 and L2.

Between the position 17 of the temperature sensor 18 and the inlet 15 and preferably also slightly beyond the sensor in the direction of fluid flow, as for example to the position of line 20—20, the wall of the main body 14 is constructed so as to permit outflow therethrough of some of the gaseous fluid being sampled. The amount of such outflow is proportioned so as to reduce to a nondetrimental amount the thickness of the boundary layer on the inside of the main body wall. The thickness of the boundary layer is here illustrated by the lines 21—22 and it is to be noted, there is an ample interior space or "sample core" space, as denoted by dimension 24, well inside the boundary layer in which the gaseous fluid, the total temperature of which is to be measured, is substantially unmixed with those portions of such fluid constituting the boundary layer. Beyond the position 17 of the temperature sensor 18 it is of no consequence that the boundary layer may thicken, even to the extent that the interior of the body 14 is filled by the boundary layer at exit 16, so long as there is an ample flow around the temperature sensor 18, of fluid constituting the sample core 24, which is not appreciably admixed with the boundary layer.

In the embodiment shown in Figures 1 and 2 and also in several others of the illustrations herein, the outflowing of gaseous fluid through the wall of main body tube 14 is accomplished by providing a scattering of small openings 25 through the wall, but it is within the purview of the invention that at least that portion of the main body wall which is around and forward of the sensor (in respect to fluid movement) may simply be composed of material which is inherently permeable to flow of the gaseous fluid therethrough, as, for example, sintered metal or ceramic material. Therefore, the apertures 25, though here shown discrete and circular, will be understood broadly to illustrate the aforesaid desired condition of permeability, however achieved. Thus slits, pertusions or drilled or punched holes may be appropriately scattered throughout the stated area of the main body wall in accordance with known aerodynamic methods or the wall is made permeable to outflow of the gaseous fluid so as to permit the boundary layer to be drawn off and its thickness thus reduced to a non-detrimental minimum, but it must be understood that the number of such apertures (or the degree of permeability) shall not be so excessive that the sample core 24 is destroyed or affected.

When the probe shown in Figures 1 and 2 has a gaseous fluid flowing in a direction generally from left to right therethrough and therearound, and when a certain velocity of such flow is achieved, a shock wave 26—27—26 will occur. The position and shape of the shock wave, as shown in Figure 1, is merely illustrative. It will be understood that the shock wave, as such, may closely approach the surface of the sensor 18, or even disappear at lower velocities. However, at velocities of Mach 1.0 and above, at some position ahead of the sensor, there will occur a zone of discontinuity, here illustrated as the wave front 26—27—26, or "shock wave." In passing through this zone, the velocity of the gaseous fluid relative to the probe is abruptly changed, for whereas in the region depicted by dimension B, the flow is at an assumed velocity relative to the probe, when at a position downstream of the wave front 26—27—26 (i.e. to the right of it in Figure 1) the velocity of the gaseous fluid relative to the probe is very low comparatively.

As a concomitant of passage through the surface of the wave front 26—27—26, the gaseous fluid is compressed adiabatically and is hence heated, and hence the sample of gaseous fluid passing into the entrance 15 in such state of compression has a temperature which is functionally related to the reduction in velocity and increase in compression that has been occasioned by this transition. At the wave front, velocity is traded for temperature, and after such trade it is the function of the probe to read the newly acquired temperature accurately. This is accomplished by utilizing principles of the instant invention.

It is the first principle of the invention that once the sample flow of gaseous fluid has entered the inlet 15 of the conduit 14, such sample should not thereafter be permitted to be cooled appreciably by admixture with the boundary layer air which is inevitably formed on the conduit wall. The boundary layer BL is invariably cooler than the sample because outside the main body conduit 14 the air is at a lower pressure and a lower temperature and the body 14 of the probe is, therefore, cool. The cool tube 14 likewise causes some cooling of the boundary layer which, if permitted to mix freely with the sample core 24, would dilute the sample. According to this invention the thickness of the boundary layer is kept from increasing by drawing off a part of such layer through the wall of the tube 14 and in this way the boundary layer is never permitted to become so thick as to destroy the usefulness of the sample.

Figure 17:
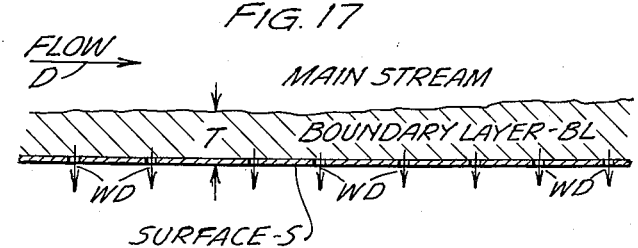

Referring to Figure 15, whenever a mainstream of gaseous fluid F flows, as depicted by arrow D along a surface S, there is built up a boundary layer BL, the thickness of which increases in the direction of stream flow. As shown by the two curves in Figure 16, the thickness of the boundary layer depends upon whether a condition of laminar flow or turbulence obtains in the boundary layer, and the thickness in either case depends on the velocity and other flow parameters. According to this invention, and as illustrated in Figure 17, the thickness T of the boundary layer can be reduced or at least can be prevented from inordinately increasing by a distributed withdrawal of the under side of the boundary layer through the surface S as depicted by the multiplicity of the arrows WD. Such withdrawal may be accomplished by providing a plurality of apertures through which the gaseous fluid is permitted to move or by making the surface S pervious to the gas passage.

Figure 18:
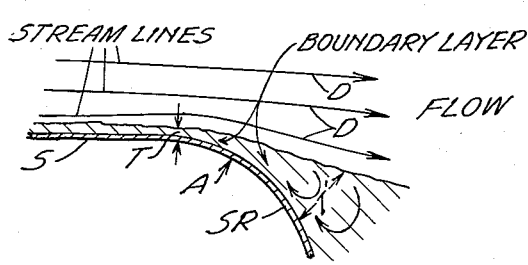
Figure 19:
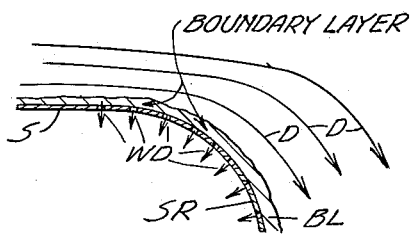

Such withdrawal of boundary layer BL via arrows WD can be occasioned by maintaining on that side of surface S which is opposite the boundary layer a static pressure less than that existing in the boundary layer. When this condition obtains, the flow occurs through any aperture that is provided.

Where the surface S recedes away from the direction D of the main flow, as at SR in Figure 18, the thickness T of the boundary layer sharply increases due to turbulence induced in the boundary layer in attempting to follow the receding surface. According to this invention it has been found that the thickness of the boundary layer even along such receding (curved) surfaces can be controlled and the thickness can be prevented from substantially increasing along the receding surface, by utilizing the expedient shown in Figure 19. Thus by distributed withdrawal of the under side portion of the boundary layer along the receding surface, as illustrated at 29, in Figure 19, the boundary layer can be kept at constant thickness or at least prevented from inordinately increasing in thickness.

The foregoing discoveries are utilized in the present invention. Thus referring to Figures 1 and 2, the pressure of the fluid to be sampled as it enters at 15, and also while inside conduit tube 14, is higher than the pressure of such fluid existing on the exterior of tube 14. The boundary layer BL of course exists on the inner surface of the tube 14, and since tube 14 is cold (as compared to the temperature of the flow of higher pressure and temperature fluid in the sample), such boundary layer is also cooled to some extent. Such cooled boundary layer BL would (if not controlled) increase greatly in thickness and mix with or even eliminate the core 24 of still hot gaseous fluid constituting the sample. Thus, if uncontrolled, the boundary layer would mix with the core 24 and introduce a temperature error as obtained by the sensor 18. In the present invention this is prevented because the cooled boundary layer BL is continually sucked off. The thickness of such cooled boundary layer is kept from increasing by the outflow of the under part of the boundary layer through the distributed apertures 25, or through the wall 14 itself, where the wall is made of gas permeable material. In this way, the sample flow which is the central core (dimension 24, Figure 1) is kept undiluted by the cooled boundary layer and this central core hence determines the temperature of sensor 18, which provides the work signal (or indication).

The apparatus of Figures 1 and 2 thus provides a useful indicia of total temperature, where error due to radiation from sensor 18 can be tolerated or otherwise taken into account and where moisture and/or solids are not present in sufficient amounts in the gaseous fluid to render the readings erroneous. Thus in some applications a probe of the Figure 1-Figure 2 type can be provided with a mounting (not shown) by which the probe is entirely shielded or is housed during low level flight and the shield, or housing, then withdrawn. Or the probe may be mounted so as to be entirely inside some airfoil, and then projected into the main stream, only after altitudes have been reached where moisture and/or solids are no longer a problem. This form of device is also useful in laboratory test work where the problems of moisture and/or solids in the air stream can be avoided.

Referring to Figures 3 and 4, the apparatus shown is similar to that shown in Figures 1 and 2, except that a radiation compensator shield tube 31 encloses the temperature sensor 18 and is mounted on tubular post 30 through which extends the post 19 supporting the sensor 18. The shield 30 is tapered at 31A so as to provide an annular clearance between it and the rear tapered part 14A of tube 14. The main body tube 14 is shaped generally like that in Figures 1 and 2 and has an inlet 15 which is larger than the exit 16, the tube being tapered at 14A at its back or trailing end. As in Figures 1 and 2, the main body tube 14 is provided with a scattering of small holes 25 throughout that part of its length beginning at inlet 15 and extending to a position at least abreast or a little way downstream (i.e. to the right in Figure 3), in respect to the temperature sensor 18. Such scattering of apertures can, if desired be continued to or almost to the exit end 16. As previously explained with reference to Figures 1 and 2, the holes 25 can be slits or pertusions or the tube 14 can be made of sintered metal or ceramic materials which has pores through it sufficient to make the tube 14 inherently permeable to outflow of the gaseous fluid sample. The objective of the holes 25 (or slits or permeable wall construction) is to permit enough of the boundary layer BL—BL to flow off so that the thickness of the boundary layer (lines 21—22) does not build up sufficiently to mix appreciably with the central core 24 before the latter has reached sensor 18. Hence the control core of the gaseous fluid sample represented by dimension 24, flows through and around the radiation shield tube 31 and the shield 31 is therefore heated to the same or nearly the same extent as is the sensor 18. Consequently the interior of the shield 31 being at about the same temperature as sensor 18, radiates to sensor 18 in the same manner as sensor 18 radiates to the shield 31 and a condition of very small net heat exchange is maintained within the tube 31 and between it and sensor 18. Consequently error due to heat loss by radiation from the sensor 18 is practically eliminated. It is preferable that the maintaining tubes 19 (of the sensor 18) and 30 (of the shield 31) be nested but independent down to base 10 so as to minimize heat conduction from sensor 18 and shield 31 to the surrounding parts.

The protective effect of shield 31 against radiation losses is particularly useful at higher Mach numbers. Thus at Mach 3 the temperature may be in the range of 550° to 600° C., which is a dull red heat, and at Mach 5 the temperature may be 1500° to 1650° C., or incandescent. At such temperatures, errors due to radiation loss from the senor can be very high if uncontrolled and even at lower or fractional Mach numbers radiation heat loss from the sensor introduces some error. Such error is avoided by utilizing the principles of the present invention.

Referring to Figures 5-10, in this form of the invention provision is made for not only controlling the boundary layer and radiation losses but provision is also made for protecting the sensor from impingement thereon of moisture or solid particles which may be entrained in the sample flow of gaseous fluid through the instrument. In this form of total temperature probe, there is provided any convenient mounting plate 40 which is adapted to the surface of a test standard or some exterior surface of the aerodynamic vehicle such as a jet plane or missile. Upon the base there is a post 41 which is tubular and has an airfoil shape as shown in dotted lines in Figures 6 and 7 so as to facilitate the flow of gaseous fluid from left to right as shown in Figures 5, 7, 8, 9, and 10 without inducing undue drag. Along one portion of the trailing edge 41A there is provided an opening shown opposite the bracket 42 in Figure 8 out of which a portion of the gaseous fluid sample is adapted to flow when the device is in operation. The shell 41 can most conveniently be made as a pair of stampings of similar shape which are then brazed or welded together along the edge 41B and along the edges 41A and thereafter polished so as to minimize drag.

At the outer end of the tube 41 there is mounted the tubular main body, or conduit, generally designed 45, of the probe. This conduit can be composed of an inner trough shaped plate 46 and an outer trough shaped piece 48. The inner piece 46 has a nearly constant cross sectional shape throughout most of its length, the trough becoming slightly shallower and narrower at the trailing end. The piece 46 has outwardly extending flanges at 47—47. Then the outer portion of the main body shell 45 is made up of another trough shaped stamping 48 also outwardly flanged along the edges and in which the depth and width of the section varies from about the same as for trough 46, at the front end, thence to a maximum at the line 58, shown by the dimension 50 in Figure 9. This portion of maximum depth of section at 50 occurs a little more than one-half the length of the stamping in the downstream direction, from the entrance mouth at 51, and the stamping 48 then decreases to a minimum depth and width as shown by the dimension 52 in Figure 9. The outer stamping 48 flanges 54—54 mate with the flanges 47—47 of the section 46 and during the assembly of the instrument the flanges are brought together and welded or brazed along their length on each side, and thereafter polished so as to reduce drag.

It will be noted that the total opening at the entrance end 51 is considerably larger than the exit opening 55. The gaseous fluid sample entering the probe at the entrance 51 will flow throughout the length of the tubular body 45 and some of the sample will escape through the exit opening 55.

As in Figures 1-4 the main body tube, or conduit, 45 is constructed so as to permit a portion of the gaseous fluid sample to seep (flow) outwardly through the very wall of the tube in that portion of the wall which is between the entrance 51 and at or slightly beyond the point at which the temperature sensor is submitted to the flow of such gaseous fluid. The main body tube 45 may, as shown, be provided with discrete openings or may be made of material which is inherently permeable to flow of gaseous fluid therethrough from the inside to the outside. In this form of the invention the conduit 45 is illustrated as being provided with a plurality of openings 56 of relatively small size which are scattered along the walls of the tube from the entrance 51 to proximate the line 57—57, which is somewhat downstream (to the right of) the temperature sensor as shown in Figures 9 and 10. Accordingly, the boundary layer BL does not build up to an excessive thickness along the inside of the conduit due to the fact that the underside of the boundary layer is continuously drawn out through the apertures 56 (or through the wall of the tube 45 in the event that it is made permeable).

At the line 58 there is provided a cylindrical tube 60 which extends down to and is fastened to the base 40 by brazing or screw thread fastening at 61. The wall thickness of the tube 60 is increased at 62 to receive set screw 78 and is then made thin by reaming the inside throughout the portion 63. The thinned out wall section 63 extends upwardly until it reaches the portion 46A of the inner conduit stamping 46 where it enters aperture 65 and is flanged over at 64 so as to form a branch passage connected to conduit 45. The portion 46A also has a large aperture at 46B and generally over this aperture is a flow controlling shield generally designated 66. This shield projects into the interior space of the conduit 45 and has a gently slanted upstream slope 66A, which reaches a maximum height at 66B and has a more sharply curved downstream slope 66C which is made as a receding curve smoothly blended so that its surface meets the inside surface inside the branch passage 63. The shield 66 is formed so that it neatly curves into and joins the inside surface of the passage 63, reaching around approximately to one-half of the diameter of 63, or to the line 58, and the entire shield is welded or brazed in place. The flow through the conduit 45 of the probe is, in general, from left to right as shown in the drawing and as illustrated by the arrow 68 of Figure 9. It is the purpose of the construction shown that a portion of this flow should curve around the shield 66 and enter into the branch passage 63 as shown by the arrows 69 and 70. Tube 63 forms a branch off of conduit 45, leading ultimately to outlet 42, and the flow of the sample of gaseous fluid is, therefore, divided at the junction of branch 63 and conduit 45. The instant invention accomplishes this diversion of the sample flow and a diversion of a portion of the sample into branch passage 63, without destroying the representative character of the portion so diverted.

The boundary layer BL will, of course, form on the entire interior surface of the conduit 45, as previously described, and there is a tendency, as shown in Figure 18, for such boundary layer to build up to an excessive thickness as the flow reaches and proceeds along a receding curved surface such as is here exemplified by the curved surface 66C. According to this invention, the tendency of the boundary layer to increase in thickness is prevented, or at least held to acceptable amounts, by providing in the receding surface 66C a number of apertures 71. The apertures 71 are usually provided in greater number per unit of area in the receding surface than for a straight surface such as along the inside of conduit 45. The reason for using a greater number of apertures 71 is that it has been found according to this invention that as the branch passage 63 diverges from the main conduit 45 the portion of the flow which is diverted into the branch must inevitably follow a curved (receding) surface in order to accomplish the separation of the sample portion from the main flow, and this tends more rapidly to increase the thickness of the boundary layer on the wall on the inside of the turn, which here is the surface 66—66C. In order to prevent the thickness of the boundary layer from increasing inordinately, there are therefore provided a greater number of holes 71 per unit of area in the receding surface 66C than are required per unit of area in the conduit 45.

Referring to Figure 9, it will be observed that the lower portion of the tube 60 (that portion which is adjacent to mounting plate 40) snugly receives a post 72 which is to be inserted from the back (or under) side of the plate 40. The post 72 is of reduced diameter at the lower (or inner) end 74 and is brazed or threaded to a socket shell 75 so that the two pieces 72 and 75 become unitary. At about the level of the thickened section 62 of the tube 60 the post 72 is provided with a shoulder and is reduced in diameter at 76, and upon this reduced portion a thin tubular radiation shield 77 is fastened and brazed or welded in place. The tube 77 fits neatly in the interior diameter of the tube 60 at the thickened portion 62 but is spaced from the thin shell 63. Accordingly, there is provided an angular space 49 between branch tube 63 and the radiation shield tube 77, and into this space a portion of the diverted portion of the sample flow of gaseous fluid may enter as shown by arrows 70, see Figure 10.

The post 72 and base 75 form a unitary construction which can be inserted into the tube 60 and a set screw 78 is threaded through the thickened portion of the tube 60 to hold them assembled. The screw 78 can be reached through the opening 42. On the base 75 there is provided a thicker shell 79 having exterior threads at 80. Shell 79 is slipped on to the outside of the shell 75 and it likewise is held in place by such screw 81.

The tubes 60 and 77 are provided with matching apertures 82—82 which are indexed into registry before screw 78 is tightened. The flow of gaseous fluid, denoted by the arrows 69, passes into the open end of tube 77, then flows through or over the temperature sensor 84, and then continues down through the tube 71 and thence passes out through holes 82—82 as indicated by the arrows 85. The flow then continues out through the aperture 42 as shown by the arrows 86.

Likewise the branch tube portion 63 is provided with one or more apertures at 88 and the flow which enters between the tubes 77 and 63 as denoted by the arrows 70, in Figure 10, will proceed downwardly in the angular space between these tubes and thence flow out of the apertures 88—88 as shown by the arrows 89 and this flow joins and forms a part of the exit flow at 86.

The center post 72 has a uniform bore throughout and its upper end is turned down as at 90° to receive a mounting 91 which is suitable for supporting the particular form of temperature sensor 84 that is used. In the illustrated form, the temperature sensor is composed of a plurality of radial vanes 92 of mica or Pyrex glass, mounted upon a center post 94, see Figure 10. These vanes are apertured so that a thin platinum wire 95 can be strung through them, and the platinum wire thus forms a resistance element which is readily susceptible to the temperature of the sample flow of gaseous fluid denoted by arrows 69 entering into the open end of tube portion 77. Two lead wires 96 are connected to the resistance wire temperature indicator 95, generally denoted 84, and extend down through glass or other insulator tubes 98 and terminate within the base shell 75, where they are connected to the requisite number of pins 100. Additional pins 100 in the shells 75 may be provided for a grounding lead 101 and additional pins also may be provided for supplying power to heater pads on the temperature probe where de-icing is required. All of the pin connections 100—101 are suitably attached to their respective leads and are mounted in fixed parallel relationship to be received by a single connector, not shown. The pins are held by a ceramic filling 102.

Referring particularly to the larger scale views, Figures 9 and 10, the flow of the gaseous fluid sample denoted by the dimension B upon entering the upstream end of the probe main body shell or conduit 45 inevitably forms the boundary layer BL. As previously explained, the boundary layer thickness is kept from becoming excessive by withdrawing the under surface of the boundary layer through a plurality of holes 56, as denoted by the arrows 104, and a sufficient number of holes are provided so as to permit such outflow from the entrance 51 to abreast or slightly downstream of the sensor, or the entire shell 45 may be made permeable so as to permit such outflow uniformly throughout the shell. In this way the central core 24 is kept from being diluted by the boundary layer.

As the sample flow approaches the location 58 it is gently diverted by the upstream slope 66A of the shield 66 and upon reaching the crest 66B would begin to form a thickened turbulent boundary layer along the receding curved surface 66C were it not for the increased withdrawal of air from the boundary layer occasioned by outflow through the greater number of apertures 71. As a result of the outflow through apertures 71, the boundary layer along surface 66C is maintained sufficiently thin so that it occupies only a portion of the thickness of the angular space between tubes 63 and 77 and the flow of that separated portion of the core 24 of the sample of gaseous fluid, denoted by the arrows 69 and 70, accordingly is a true and representative fraction of the center core 24 of the sample even after being thus diverted at the junction of conduits 45 and branch passage 63. Being thus a true sample, the diverted portion heats the sensor 84 and shield 77 to substantially the same temperature as they would be heated, were they placed in the central core 24 itself. The temperature sensor 84 does not lose temperature appreciably by radiation, and being located in the divergent branch 63 is protected from impingement of moisture and solids thereon.

Referring to Figures 8 and 9 particularly, it will be recalled that upstream from the entrance 51 of the temperature probe main body 45, when the velocity exceeds about Mach 0.3 a standing shock wave is formed as illustrated in Figures 1 and 3. Ahead of the shock wave (or to the left as shown in Figures 5–10) the velocity of the gaseous fluid relative to the probe is the undisturbed relative velocity, whereas to the right of the shock wave the velocity has been traded for an adiabatic increase in pressure and increase in temperature. Hence the sample of gaseous fluid entering the mouth 51 of the tube 45 is at a higher pressure and higher temperature than the air surrounding the entire instrument, and it will tend to flow out of any apertures of the probe whether such apertures be the scattered discrete apertures 56—56 as illustrated or through the aperture intricacies of a permeable wall of tube 45 where it is so constructed. Such outflow also occurs from the opening 42 as shown in Figures 8 and 9 and, of course, from exit 55.

The position of the aperture 42 can be on any portion of the main supporting tube 41 where the exterior pressure is less than that maintained in the portion 41 in flight, or may even be through plate 40 into the aircraft or missile, if outflow from the latter can be elsewhere accomplished to a zone of lower pressure.

Accordingly, some of the sample flows through the apertures 71 (see Figure 10) thence down through the larger aperture 46B and into the interior of the support tube 41 and thence therefrom, as out through aperture 42. Flow also occurs as indicated by arrows 85 and 89 and thence along arrows 86 to the exterior.

In a modified form of the invention as shown in Figure 13 the single aperture at 42 may be replaced by a plurality of smaller apertures 105 which are introduced through any portion of the wall of the support tube 41 along which the exterior pressure is normally less than maintained in the interior of the tube 41.

Referring to Figures 9 and 10, any hard object such as a grain of sand, an insect or a fluid droplet entering the open mouth 51 of the sample tube will move along a relatively straight line and even if the entrance direction thereof should not be axial with the conduit tube 45, but should for example be as much as possible towards the temperature sensor 84, it would not strike the sensor due to the fact that the sensor is situated in the branch conduit 63. Thus assuming a particle should enter along the direction of line 106—106, the particle would miss entirely the entrance into the tube 63 since such solid particle or water droplet travels in a substantially straight line at the velocities encountered. The location of the shield 106 as shown assists in deflecting solid and liquid particles from the open end of the tube 63.

Figure 10 is slightly modified at its entrance mouth 51, as compared to Figure 9, being provided with a slightly bell shaped opening at 107—107. The bell shaped (or bell mouth) form of opening may optionally be used and assists somewhat in permitting a smooth entrance of the air sample during conditions when the entrance direction of the sample is not quite in alignment with the central axis 108—108 of the tube 45. It is also desirable whether or not the bell shaped mouth is used to provide a few extra apertures 56 adjacent the leading edge 109 as shown in Figure 12. These serve to minimize the possibility, particularly at high Mach numbers, of the sample breaking entirely from the inside of the conduit 45 and forming a high speed core.

At speeds above Mach 0.8 the air total temperature will be sufficiently elevated so as inherently to prevent icing of the entire instrument but at velocities of Mach 0. to 0.8 it is entirely possible for ice to build up in and on the instrument and icing conditions are likely to be most pronounced at Mach 0. to 0.4. In Figure 11 there are illustrated the areas of the instrument to which de-icing heaters may be applied to best advantage. Thus a de-icing heater 110—110 may be applied at or closely adjacent the entrance mouth 51 and another heater 111 may be applied upon the diverging portions of the shell 45. Likewise under some conditions ice may build up on the inside in the converging portion 45A of the shell and to prevent this a heater 112 may advantageously be applied. The building up of ice upon the supporting shell 41 is usually most pronounced on the leading edge 41B and can be dissipated by a heater at 114 which can be applied on the inside of the tube 41. If ice builds up in the portion 41C of the tube 41 heaters can advantageously be applied on the inside of the shell at the area 115.

Due to the fact that the shell 45 is provided with apertures throughout those portions of its area which are abreast or upstream in respect to the temperature sensor, the application of heat to the shell via heaters 110 and 111 causes no disturbance in the probe temperature reading. This is because the outflow of air through the shell wall causes the heat from the heaters to be moved always away from the central core 24 of the sample Figure 11. The heaters 110—115 are, of course, so applied as not to interfere with the apertures 56 or with the outflow of air through the shell 45 in the event the shell is made of inherently permeable material.

In Figure 14, there is illustrated a form of the invention similar to that shown in Figures 3 and 4 except that, as compared to Figures 3 and 4 there are two heat radiating shields 116 and 117 provided nested one within the other, the shields being in turn nested within the main body conduit 118 of the instrument. In this instance the main body conduit 118 is illustrated as of a material such as sintered metal or sintered ceramics which are inherently permeable so as to permit an outflow of a part of the gaseous sample therethrough. The tubes 116 and 117 are supported by a tubular member 119 within the main support 120 and the temperature sensor 121 is in turn supported upon a centrally located tube 122. All of the tubes 116, 117, and 118 are tapered as at 116A, 117A, and 118A and uniform angular spaces are thus provided around the temperature sensor 121, between it and the tube 116, and between the tubes 116 and 117 and the tubes 117 and 118. The entrance mouth of the outer tube 118 is bell shaped as at 118B.

In the form of probe shown in Figures 5–11, the axis of branch passage 63 is at substantially 90° to the axis of conduit 45 and this form of probe therefore represents a relatively large angularity of divergence of the branch passage with respect to the conduit. It is within the purview of the invention that the branch passage may diverge at a lesser angle than 90° if so desired, and this has some advantages in that the divergent portion of the sample core 24 which is caused to enter tube 63 need not be turned so completely away from the axis of core 24 and the tendency of the boundary layer to increase on the receding surface 66C is to some degree mitigated by this expedient.

It is apparent that many modifications and variations of this invention as hereinbefore set forth may be made without departing from the spirit and scope thereof. The specific embodiments described are given by way of example only and the invention is limited only by the terms of appended claims.

I claim as my invention:

1. A total temperature probe comprising a conduit constructed for passage therethrough of a sample flow of gaseous fluid, said conduit having an inlet which is adapted to be directed forwardly and an outlet which is smaller than the inlet and which is spaced from the inlet in the direction of flow of the sample through the conduit, a temperature sensor mounted in the conduit and out of contact with the conduit walls and at a location along the direction of flow of the sample and between the inlet and outlet of the conduit, said conduit being provided with a plurality of restricted fluid flow passageways therethrough in that portion of the conduit from adjacent the inlet to adjacent the sensor for outflow of the boundary layer gaseous fluid from such portion of the interior of the conduit.

2. A total temperature probe comprising a conduit constructed for passage therethrough of a sample flow of gaseous fluid, said conduit having an inlet which is adapted to be directed forwardly and a smaller size outlet which is spaced from the inlet in the direction of flow of the sample through the conduit, a temperature sensor mounted in the conduit and out of contact with the conduit walls and at a location along the direction of flow of the sample and between the inlet and outlet of the conduit, said conduit being provided with a plurality of apertures scattered along the conduit between the inlet and the location of the sensor, said apertures being of a size smaller than the inlet so as to permit only a limited outflow of fluid therethrough.

3. A total temperature probe comprising a conduit constructed for passage therethrough of a sample flow of gaseous fluid, said conduit having an inlet which is adapted to be directed forwardly and an outlet which is smaller than the inlet and which is spaced from the inlet in the direction of flow of the sample through the conduit, a temperature sensor mounted in the conduit and out of contact with the conduit walls and at a location along the direction of flow of the sample and between the inlet and outlet of the conduit, at least that portion of the conduit from the inlet to adjacent the location of the sensor being permeable to the outflow of the sample fluid.

4. A total temperature probe comprising a conduit constructed for passage therethrough of a sample flow of gaseous fluid, said conduit having an inlet which is adapted to be directed forwardly and an outlet which is spaced from the inlet in the direction of flow of the sample through the conduit, a temperature sensor mounted in the conduit and out of contact with the conduit walls and at a location along the direction of flow of the sample and between the inlet and outlet of the conduit, said conduit being tapered to provide an increased cross-sectional area in the downstream direction from the inlet to the sensor and then a decrease in cross-sectional area from the sensor to the outlet, the inlet being larger than the outlet that portion of the conduit between the inlet and adjacent the sensor being constructed with a plurality of restricted fluid flow passages therethru so as to permit boundary layer fluid to escape therethru to the exterior of the conduit.

5. A total temperature probe comprising a conduit constructed for passage therethrough of a sample flow of gaseous fluid, said conduit having an inlet which is adapted to be directed forwardly and an outlet which is smaller than the outlet and which is spaced from the inlet in the direction of flow of the sample through the conduit, a temperature sensor mounted in the conduit and out of contact with the conduit walls and at a location along the direction of flow of the sample and between the inlet and outlet of the conduit, said conduit walls being constructed with a plurality of restricted fluid flow passageways therethru said restricted fluid flow passageways being so constructed as to permit a greater outflow of boundary layer adjacent the inlet than elsewhere between the inlet and said sensor.

6. A total temperature probe comprising a conduit constructed for passage therethrough of a sample flow of gaseous fluid, said conduit having an inlet which is adapted to be directed forwardly and an outlet which is smaller than the inlet and which is spaced from the inlet in the direction of flow of the sample through the conduits, a temperature sensor mounted within the conduit along the line of said fluid flow and at a position between the inlet and the outlet and spaced from the walls of the conduit, a radiation shield interposed between the temperature sensor and the conduit and spaced from each of said sensor and conduit, said conduit being provided with a plurality of restricted fluid flow passageways therethrough in that portion of the conduit from adjacent the inlet to adjacent the sensor for outflow of the boundary layer gaseous fluid from such portion of the interior of the conduit.

7. The total temperature probe specified in claim 6 further characterized in that both the radiation shield and conduit are tapered to lesser cross-sectional areas in the direction of downstream flow of the gaseous sample.

8. A total temperature probe comprising a walled conduit having an inlet adapted to be directed forwardly in respect to flow of gaseous fluid and an outlet smaller than the inlet for the passage therethrough of a sample flow of such gaseous fluid, said conduit being provided with a branched passage connected to the conduit between said inlet and outlet, said branch passage having a supplementary outlet for delivering a portion of the gaseous fluid therefrom, that portion of the walls of the conduit from adjacent the inlet to adjacent said branch passage being provided with restricted fluid flow passages therethrough so as to permit a limited outflow of boundary layer gaseous flow from the interior of the conduit to the exterior thereof and a temperature sensor mounted in the branch passage adjacent the junction thereof to said conduit.

9. A total temperature probe comprising a walled conduit having an inlet adapted to be directed forwardly in respect to a flow of gaseous fluid and an outlet smaller than the inlet for the passage therethrough of the sample flow of such gaseous fluid, said conduit being provided with a branch passage connected to the conduit between said inlet and outlet, said branch passage having a supplementary outlet for delivering a portion of the gaseous fluid therefrom, a temperature sensor mounted in said branch passage, the walls of the conduit from adjacent the inlet to adjacent said branch passage being provided with restricted fluid flow passages therethrough so as to permit a limited outflow of boundary layer gaseous fluid from the interior of the conduit to the exterior thereof, and a shield around the temperature sensor and spaced therefrom and from the branch passage.

10. A total temperature probe comprising a conduit having an inlet adapted to be forwardly directed in respect to a flow of gaseous fluid and an outlet smaller than the inlet for the passage therethrough of a sample flow of such gaseous fluid, a branch passage connected to the conduit between such inlet and outlet, said branch passage having a supplementary outlet for delivering therefrom that portion of the gaseous fluid flowing through the branch passage, that portion of the conduit from adjacent the inlets to adjacent said branch passage being provided with apertures therethrough so as to permit a limited outflow of boundary layer gaseous fluids from the interior of the conduit, a radiation shield mounted in the branch passage in spaced relation thereto, said radiation shield having a separate outflow channel connected to the exterior of the probe for the outflow of gaseous fluid from the interior thereof, and a temperature sensor mounted within the radiation shield.

11. A total temperature probe comprising a walled conduit having an inlet adapted to be directed forwardly in respect to a flow of gaseous fluid and an outlet smaller than the inlet for passage therethrough of a sample flow of such gaseous fluid, said conduit being provided with a branch passage connected to the conduit between said inlet and outlet, said branch passage being joined to said conduit by a smoothly curved surface leading from said conduit into said branch passage, said branch passage being provided with a supplementary outlet for delivering therefrom a portion of the gaseous fluid flowing through the branch passage, that portion of the walls of the conduits from adjacent the inlet to adjacent said branch passage and along said smoothly curved surface being provided with the restricted fluid flow apertures therethrough so as to permit a controlled outflow of boundary layer gaseous fluid from the interior of the probe to the exterior thereof and a temperature sensor mounted in said branch passage.

12. A total temperature probe comprising a conduit having an inlet adapted to be directed forwardly in respect to a flow of gaseous fluid and an outlet smaller than the inlet for passage therethrough of a sample flow of such gaseous fluid, said conduit being provided with a branch passage connected to the conduit between said inlet and outlet, the cross-section of said conduit being increased from the inlet to adjacent said branch passage and thereafter decreased to the outlet, said branch passage being joined to said conduit by a smoothly curved surface, the wall of said conduit between the inlet and the junction of said branch passage with said conduit being provided with a plurality of apertures, the number of said apertures being increased adjacent the inlet and along said smoothly curved surface by which the branch passage is connected to the conduit, a tubular radiation shield positioned in said branch passage so as to receive and pass therethrough a portion of said sample flow, said radiation shield being provided with a separate outlet to the outside of the probe for delivering therefrom the portion of the sample flow passing through the interior of said radiation shield, and a temperature sensor mounted in said radiation shield in a position out of the direct line of flow from the inlet to the outlet of said conduit.

13. A total temperature probe comprising a metallic conduit constructed for passage therethrough of the sample flow of gaseous fluid, said conduit having an inlet which is adapted to be directed forwardly and an outlet which is smaller than the and which spaced from the inlet in the direction of flow of the sample from the conduit, a temperature sensor mounted in the conduit and out of contact with the walls thereof and at a location along the direction of flow of the sample and between the inlet and outlet of the conduit, said conduit being provided on its exterior surface with a plurality of electrically operated de-icer heaters, which are attached to the conduit so as to heat it, those portions of the conduit between the location of the temperature sensor and the inlet of the conduit being provided with a plurality of restricted fluid flow passages through the conduit for outflow therethrough of the boundary layer gaseous fluid on the interior of the conduit.

14. A total temperature probe comprising a conduit extending in substantially a straight line from an inlet to an outlet, the outlet being of somewhat smaller area than the inlet, said conduit being gradually increased in cross-sectional area from the inlet to a location intermediate the inlet and the outlet, a branch passage extending at an angle from said conduit at said location and connected to said conduit for receiving a flow from the conduit into the branch passage, said branch passage having a supplemental outlet for delivering therefrom fluid flowing through the branch passage, a deflector in said conduit extending from adjacent the conduit wall and upstream in respect to the branch passage, said deflector being shaped as a curved surface extending from the line of the conduit wall, thence along a gradual curve towards the centerline of the conduit and thence along a receding curve and back into said branch passageway, that portion of the conduit which is between the inlet and said branch passageway and said deflector being provided with a plurality of spaced apertures through the walls thereof extending to the exterior of the probe so as to permit a limited outflow of boundary layer gaseous fluid from the interior of the probe through those portions of the walls thereof and through said deflector to the exterior of the probe, said branch passage extending at an angle to the straight line from the inlet to the outlet of the conduit and a temperature sensor in said branch passage.

15. The total temperature probe of claim 14 further characterized in that a radiation shield is provided in spaced relation around said sensor within the branch passage, said shield being open at one end so as to permit the flow of gaseous fluids therethrough, a separate outlet being provided from the interior of said shield to the exterior of the probe.

References Cited in the file of this patent

UNITED STATES PATENTS

| | | |
|---|---|---|
| 2,414,370 | Floyd | Jan. 14, 1947 |
| 2,496,807 | Moffatt | Feb. 7, 1950 |
| 2,536,037 | Clousing et al. | Jan. 2, 1951 |
| 2,588,840 | Howland | Mar. 11, 1952 |

FOREIGN PATENTS

| | | |
|---|---|---|
| 758,069 | Germany | Aug. 9, 1954 |

OTHER REFERENCES

Publication, NACA Technical Note Co., 1885, May 1949, copy in 73–204, by Goldstein and Scherrer.

Article by W. J. King, Transactions, ASME, July 1943, pages 424–7, copy in 73–349.

Article, "Probe Recovery Factor," by Humphreys in "Instruments & Automation," February 1954, page 283, copy in 73–349.